United States Patent [19]

Corbach et al.

[11] Patent Number: 4,542,314
[45] Date of Patent: Sep. 17, 1985

[54] PERMANENT-MAGNET COMMUTATOR MOTOR WITH AUXILIARY POLE/BRACKET

[75] Inventors: Rainer Corbach, Lüdinghausen; Berthold Utsch, Bochum; Adolf Mohr, Bühlertal; Kurt Zimmermann, Bietigheim, all of Fed. Rep. of Germany

[73] Assignee: Robert Bosch GmbH, Stuttgart, Fed. Rep. of Germany

[21] Appl. No.: 627,740

[22] Filed: Jul. 5, 1984

[30] Foreign Application Priority Data

Aug. 3, 1983 [DE] Fed. Rep. of Germany ... 8322323[U]

[51] Int. Cl.⁴ .......................................... H02K 23/42
[52] U.S. Cl. ...................................... 310/154; 310/42; 310/254
[58] Field of Search ............. 310/40 MM, 42, 44, 153, 310/154, 218, 254, 256, 259

[56] References Cited

U.S. PATENT DOCUMENTS

| | | | |
|---|---|---|---|
| 3,083,310 | 3/1963 | Tweedy et al. | 310/44 |
| 3,594,599 | 7/1971 | West et al. | 310/258 |
| 3,988,623 | 10/1976 | Yamaguchi et al. | 310/254 |
| 4,182,027 | 1/1980 | Benezech | 310/153 |

FOREIGN PATENT DOCUMENTS

| | | | |
|---|---|---|---|
| 0048966 | 4/1982 | European Pat. Off. | 310/154 |
| 2512273 | 9/1976 | Fed. Rep. of Germany | 310/154 |
| 1361198 | 4/1964 | France | 310/254 |
| 1389519 | 4/1975 | United Kingdom | 310/154 |

Primary Examiner—Peter S. Wong
Assistant Examiner—D. L. Rebsch
Attorney, Agent, or Firm—Michael J. Striker

[57] ABSTRACT

A permanent-magnet excited commutator motor, particularly a multipole small motor, has a stator yoke, an armature, two permanent magnet elements having a relatively low permeability, the permanent magnet elements having end tips with a gap formed between, the permanent magnet elements having one tip located forwardly as considered in the rotary direction of the armature, and a ferromagnetic auxiliary pole arranged on the stator yoke and having a relatively high permeability, the auxiliary pole being a U-shaped bracket having legs abutting against the end faces of the low permeability magnet elements, the bracket which forms the auxiliary pole being elastic and asymmetrical and formed as a holding spring, and legs of the bracket including a thicker leg and a thinner leg, where the thicker leg is formed as a stray web abutting against the permanent magnet tip lying forwardly in the rotary direction of the armature.

10 Claims, 2 Drawing Figures

PERMANENT-MAGNET COMMUTATOR MOTOR WITH AUXILIARY POLE/BRACKET

BACKGROUND OF THE INVENTION

The present invention relates to a permanent-magnet excommutator motor which has a ferromagnetic auxiliary pole with a high permeability formed as a U-shaped bracket and arranged on a stator yoke in a gap between two permanent magnet poles of a low permeability.

Motors of the aforementioned general type are known in the art. One of such motors is disclosed, for example, in the U.S. Pat. No. 3,083,310. In the embodiment described in this patent the permanent magnets are secured by a U-shaped bracket of steel which is welded on a tubular stator yoke. The DE-OS No. 2,512,273 discloses a permanent-magnet excited commutator machine which has permanent magnet poles of a low permeability and U-shaped auxiliary poles of ferromagnetic materials with a high permeability. The auxiliary poles are located in the interpolar gaps and form stray webs for the armature transverse field. Thereby the machine obtains series connection behavior, since with increasing armature current, an increasing armature transverse field is obtained which during operation of the motor produces an additional flux through the stray pole. Thus an excitement field dependent on a current is produced, which is required for the series connection behavior.

The EP-A1 No. 48,966 discloses a motor in which, for obtaining a series connection behavior with permanent-magnet excited motors, a ferromagnetic auxiliary pole is arranged at the side of a permanent magnetic segment. It is mounted by gluing at that end of the permanent magnet segment which lies at the leading tip of the armature. The dimension of the auxiliary pole must be such that it occupies approximately 20 percent of the pole pitch. Iron is preferably used as a ferromagnetic material for the auxiliary pole; it has a high permeability, so that with increasing armature current it takes charge of the stray flux through the armature transverse field. Thus the motor torque increases with high load, but particularly during starting of the motor.

Motors are also disclosed in U.S. applications Ser. Nos. 085,513; 166,251; 179,280; 815,073; 825,002; 884,637; 934,546 and U.S. Pat. No. 4,155,021 of the same inventor.

SUMMARY OF THE INVENTION

Accordingly, it is an object of the present invention to provide a commutator motor which avoids the disadvantages of the prior art.

In keeping with these objects and with others which will become apparent hereinafter, one feature of the present invention resides, briefly stated, in a permanent-magnet excited commutator motor in which the auxiliary pole is formed as a holding spring of an elastic asymmetrical bracket with differently thick legs, and the thicker leg is formed as a stray web abutting against a leading permanent magnet tip as considered in the rotary direction of the armature.

When the commutator motor is designed in accordance with these features, only one structural part is used as a stray web, on the one hand, making possible an especially simple mounting for the magnet segments, on the other hand.

By the asymmetrical construction of the U-shaped bracket, one leg can have sufficient ferromagnetic material for formation of the stray pole, whereas the other leg and in some cases the bottom of the U-shaped bracket are thinner, for obtaining a spring characteristic.

In addition to saving of separate structural parts for holding and stray pole, the mounting is essentially facilitated, so that additional working time during assembling of the motor is saved. In accordance with another advantageous feature of the present invention, the inventive asymmetrical bracket is provided between all neighboring permanent magnet segments which form different poles, whereas as a rule each pole is formed from an individual radially magnetizable permanent magnet segment.

The novel features of the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
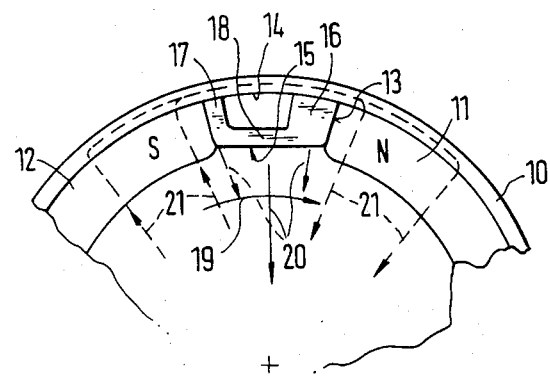
FIG. 1 is a view showing a permanent-magnet excited commutator motor in accordance with one embodiment of the present invention.
Figure 2:
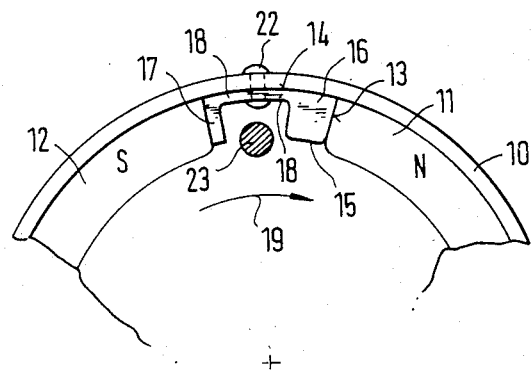
FIG. 2 is a view showing a permanent-magnet commutator motor in accordance another embodiment of the invention.

FIGS. 1 and 2 show a yoke of a two-or multi-pole commutator motor energized by a permanent magnet. The armature and the details of the stator are dispensed with, since the motor can be designed in any manner.

A stator yoke of a commutator motor is identified in FIG. 1 with reference numeral 10. Energization (excitation) of the commutator motor is performed by permanent magnet segments 11 and 12. The segments 11 and 12 are magnetized radially. The drawing shows only the polarity inwardly located on the periphery of the armature in the respective segment. A permanent magnet tip located forwardly in the rotary direction of the not shown armature and also called a leading magnet tip is identified with reference numeral 13. An interpolar gap 14 is located between both magnet segments 11 and 12. A U-shaped bracket 15 of a ferromagnetic material with high permeability is arranged in the interpolar gap 14. The magnet segments 11 and 12 have a considerably lower permeability than the bracket 15 which forms a ferromagnetic auxiliary pole.

The bracket 15 has a thicker leg 16 and a thinner leg 17. The bottom 18 of the bracket 15 is formed with a thickness substantially corresponding to the thickness of the thin leg 17. Because of these the legs 17 and 18 have a sufficient elasticity to guarantee, despite some manufacturing tolerances, an unobjectionable force-transmitting mounting of the magnet segments 11 and 12. An arrow 19 identifies the rotary direction of the not shown armature.

Various magnetic fluxes in the motor are identified by arrows. An arrow 20 identifies a magnetic flux for an armature transverse field, whereas an arrow 21 identifies a main flux extending from the magnet segments.

FIG. 2 shows a commutator motor in accordance with another embodiment of the invention. Parts which are identical to the parts of the commutator motor shown in FIG. 1 are identified with the same numerals, since the design of the motor of FIG. 2 is basically similar to the design of the motor of FIG. 1.

The arrangement and mounting of the U-shaped bracket 15 in FIG. 2 differs from those in FIG. 1. More particularly, the bracket 15 with its bottom 18 is connected by rivets with the stator yoke 10. Instead of riveting, the bracket 15 can also be welded to the stator yoke.

A through screw 23 for housing mounting is located between the legs 16 and 17 of the bracket in the arrangement of FIG. 2. Such screws are conventionally provided at diametrically opposite locations in the stator of the motor. And the bracket used there is arranged in the shown manner. The action of the auxiliary pole and the elastic mounting of the permanent magnet segments 11 and 12 do not change, since in both arrangements the segments 11 and 12 are pressed away from one another by the thin elastic leg 17 of the bracket 15 and thereby held in the radial and tangential direction.

The arrangement in accordance with the present invention makes possible an elastic magnet mounting in the motor housing with stray web effect, whereby it is possible to impart to permanent-magnetically excited motors a behavior of series connection, whereas because of flux, they also have a parallel connection behavior of the rotary speed-torque characteristic line. For many applications the series connection behavior of a motor is an advantage because of the higher idle running rotary speed. In electrically excited motors the series connection behavior is obtained by an exciting winding through which an armature current flows, so that the flux increases with the increase of the armature current. In a permanent-magnet excited motor a similar phenomenon takes place by the flux of the armature transverse field over the stray web in form of the leg 16, since the armature transverse field increases with the increase of the armature current. At the leading magnet tip 13 in the region of the stray pole 16, the main flux 21 and the flux 20 of the armature transverse field are added, whereas the opposite flux 20 of the armature field and the neighboring magnet segment 12 only insignificantly influence the main flux 21 because of the low permeability.

On the other hand, the permanent-magnet motors have an advantage, particularly with respect to efficiency, since the flux is obtained without loss. Because of the combination of the advantages of the permanent motor with the advantages of the series connection behavior and because of the particularly advantages solution relative to the design of the auxiliary pole, essential advantages are provided in the inventive arrangement. The asymmetrical bracket 15 combines in itself the design of the auxiliary pole and a holding string for the magnet segments. During start of the motor the thick leg 16 of the bracket 15 is brought so strongly into saturation, that it is practically inactive. Thus it remains to obtain the starting moment of the motor. After starting, a parallel flux is formed on the leading magnet tip 13 via the thicker leg 16 of the bracket 15, so that a flux weakening and a rotary speed increase takes place. In this manner the permanent magnet flux is controlled in dependence on the armature transverse field, and also with the use of the permanent magnets for the excitement of the commutator motor, a series connection behavior is obtained. The arrangement is thus equal to a regulated permanent magnet motor, where the arrangement and mounting of the various parts of the stator are solved in an especially simple and advantageous manner.

It will be understood that each of the elements described above, or two or more together may also find a useful application in other types of constructions differing from the types described above.

While the invention has been illustrated and described as embodied in a permanent-magnet excited commutator motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A permanent-magnet excited commutator motor, particularly a multipole small motor, comprising a stator yoke; an armature rotatable in a predetermined direction; two permanent magnet elements having a relatively low permeability, said permanent magnet elements having end faces with a gap formed therebetween, said permanent magnet elements also having permanent magnet tips including one permanent magnet tip located forwardly as considered in the rotary direction of said armature; and a ferromagnetic auxiliary pole arranged on said stator yoke and having a relatively high permeability, said auxiliary pole being formed as a U-shaped bracket having legs abutting against said end faces of said permanent magnet elements, said bracket which forms said auxiliary pole being elastic and asymmetrical and formed as a holding spring, and said legs of said bracket including a thicker leg and a thinner leg, wherein said thicker leg is formed as a stray web abutting against said one permanent magnet tip lying forwardly in the rotary directtion of said armature.

2. A commutator motor as defined in claim 1, wherein said bracket is fixedly connected with said stator yoke; and further comprising means for fixedly connecting said bracket with said stator yoke.

3. A commutator motor as defined in claim 2, wherein said means for connecting said bracket with said stator yoke is formed as a riveting means.

4. A commutator motor as defined in claim 2, wherein said means for connecting said bracket with said stator yoke is formed as welding means.

5. A commutator motor as defined in claim 1, wherein said bracket is formed so that it is clamped between said permanent magnet elements.

6. A commutator motor as defined in claim 1, wherein said bracket has a bottom facing toward said armature.

7. A commutator motor as defined in claim 1, wherein said permanent magnet elements form a second such gap which is diametrically opposite to said first mentioned gap; and further comprising a housing and through screws extending in said gaps and mounting said housing.

8. A commutator motor as defined in claim 1, wherein said bracket has a bottom which is arranged so that it faces towards said stator yoke.

9. A commutator motor as defined in claim 1; and further comprising at least two further such permanent magnet elements, and at least one further such elastic bracket which forms a stray web and is arranged between said two further permanent elements.

10. A commutator motor defined as defined in claim 1, wherein said permanent magnet elements are formed as permanent magnet segments.

* * * * *